(12) United States Patent
Kimura et al.

(10) Patent No.: US 6,673,485 B2
(45) Date of Patent: Jan. 6, 2004

(54) BATTERY MODULE

(75) Inventors: Kenji Kimura, Osaka (JP); Akira Iwamura, Kawanishi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 326 days.

(21) Appl. No.: 09/948,441

(22) Filed: Sep. 7, 2001

(65) Prior Publication Data
US 2002/0031702 A1 Mar. 14, 2002

(30) Foreign Application Priority Data
Sep. 8, 2000 (JP) ........................................ 2000-272815

(51) Int. Cl.[7] ................................................ H01M 2/10
(52) U.S. Cl. .................... 429/99; 429/151; 429/157; 429/158; 429/159; 429/160; 429/161
(58) Field of Search ................................ 429/96, 98, 99, 429/100, 129, 130, 131, 133, 151, 152, 153, 157, 158, 159, 160, 161, 164

(56) References Cited

U.S. PATENT DOCUMENTS

| | | | | |
|---|---|---|---|---|
| 5,489,484 A | * | 2/1996 | Wheeler et al. | 429/98 |
| 5,900,332 A | * | 5/1999 | Marukawa et al. | 429/158 |
| 5,919,585 A | * | 7/1999 | Wheeler et al. | 429/97 |
| 6,120,564 A | * | 9/2000 | Marukawa et al. | 29/623.1 |
| 6,187,470 B1 | * | 2/2001 | Peterson | 429/99 |
| 6,224,997 B1 | * | 5/2001 | Papadopoulos | 429/99 |
| 6,265,098 B1 | * | 7/2001 | Audit et al. | 429/94 |
| 6,303,248 B1 | * | 10/2001 | Peterson | 429/177 |
| 6,411,063 B1 | * | 6/2002 | Kouzu et al. | 320/150 |
| 6,444,350 B1 | * | 9/2002 | Toya et al. | 429/90 |
| 6,489,747 B2 | * | 12/2002 | Abe | 320/112 |
| 6,517,966 B1 | * | 2/2003 | Marukawa et al. | 429/120 |
| 6,558,835 B1 | * | 5/2003 | Kurisu et al. | 429/159 |

FOREIGN PATENT DOCUMENTS

| | | |
|---|---|---|
| EP | 0964470 | 12/1999 |
| FR | 2789228 | 8/2000 |
| JP | 8-329971 | 12/1996 |
| JP | 10-106533 | 4/1998 |
| JP | 10-112299 | 4/1998 |
| JP | 10-340738 | 12/1998 |
| JP | 2000-62472 | 2/2000 |

* cited by examiner

Primary Examiner—Bruce F. Bell
(74) Attorney, Agent, or Firm—Jordan and Hamburg LLP

(57) ABSTRACT

A battery module is fabricated as follows. A plurality of elements for electromotive force is accommodated in a one-piece cylindrical case and is arranged in series in an axial direction of the case. The elements for electromotive force are electrically connected through an electric connector passing through a resin partition wall which separates the elements for electromotive force from one another. The both ends of the case are sealed with sealing plates.

12 Claims, 12 Drawing Sheets

Prior Art

BATTERY MODULE

The present disclosure relates to subject matter contained in priority Japanese Patent Application No. 2000-272815, filed on Sep. 8, 2000, the contents of which is herein expressly incorporated by reference in its entirety.

BACKGROUND OF THE INVENTION

1. Technical Field of the Invention

The present invention relates to a battery module, and more particularly to a battery module used as a battery power source for an electric vehicle.

2. Description of Related Art

FIG. 1 shows a conventional battery module disclosed in Japanese Laid-open Patent Application No. 10-106533, the battery module made by connecting a plurality of cells and coupling them integrally so as to obtain a necessary power capacity. In the conventional battery module, a plurality of cylindrical cell A shown in FIG. 2 are arranged in series in the axial direction thereof, and adjacent cells are connected together through a connector 1 shown in FIGS. 3A to 3C, by welding.

As shown in FIGS. 3A to 3C, the connector 1 is formed like a circular dish having two steps in a depth direction. An opening 17 is concentrically formed in a bottom plate 5 of the connector 1, the opening 17 for inserting a protruding portion 14 of an electrode 10 of the cell A therethrough. As shown in FIG. 4, four projections 2 formed on the bottom plate 5 of the connector 1 are welded to the electrode 10 of the cell A. Subsequently, four projections 3 formed on a cylindrical wall 4 of the connector 1 are welded to a cell case 11 of another cell A, thereby connecting the cells electrically and mechanically together.

Another conventional battery module is disclosed in Japanese Laid-open Patent Application No. 10-112299. As shown in FIG. 5 and FIG. 6, the battery module includes a tube body 21, a plurality of elements for electromotive force (i.e., unit cells). 25a, 25b, and 25c fitted on the peripheral surface of the body 21, and a case 22 for covering them. In other words, the battery module is made by accommodating a plurality of elements for electromotive force in a single case.

Furthermore, Japanese Laid-open Patent Application. No. 8-329971 discloses another battery module. As shown in FIG. 7, the battery module includes a plurality of sealed elements for electromotive force 31, a single case 36 for accommodating the elements 31, and a connector 35 for connecting the elements 31.

However, the conventional battery modules have some disadvantages. The battery module disclosed in Japanese Laid-open Patent Application No. 10-106533 necessitates a number of connectors. Moreover, it is difficult to ensure a desired mechanical strength of the battery module, since the battery module is made by connecting a plurality of cells. Furthermore, the connectors are exposed in an external atmosphere, so that they may be progressively subjected to corrosion when condensation occurs thereon due to sudden changes in environmental temperature.

Regarding the battery module disclosed in Japanese Laid-open Patent Application No. 10-112299, it is very difficult to electrically connect between collector leads 26b, 26c and a collector lead fixing member 27c for connecting between the collector leads 26b, 26c, while reducing a dead space between them.

Furthermore, the battery module disclosed in Japanese Laid-open Patent Application No. 8-329971 has a low resistance to pressure of gas generated from the element for electromotive force, since each of the elements is sealed with a sealing sheet. What is worse, such a battery module is unsuitable for a large capacity electric discharge because a current-feeding portion is made of a thin metal plate in order to seal each of the elements.

SUMMARY OF THE INVENTION

An object of the present invention is to provide a battery module having a high mechanical strength, a high weight energy density, a high volume energy density, and a corrosion-free connection between cells.

To achieve the above object, according to the present invention, there is provided a battery module which includes a cylindrical or columnar case; a plurality of elements for electromotive force accommodated in the case, the elements being placed in series in the axial direction of the case; a partition wall for spatially isolating the elements from one another; an electric connector for connecting the elements through the partition wall; and sealing plates placed on both ends of the case. In the battery module, a desired mechanical strength is obtained because the plurality of elements for electromotive force is accommodated in a single case. Moreover, since the connecting portion between the elements for electromotive force is positioned inside the case, a corrosion-free connection between the elements is achieved and the dead space is minimized, resulting in a high weight energy density and a high volume energy density. Preferably the electric connector is loaded into the partition wall by pressing, so that the boundary face therebetween is sealed to prevent liquid or gas leakage.

These and other objects and characteristics of the present invention will become further clear from the following description with reference to the accompanying drawings.

DETAILED DESCRIPTION OF THE PREFERRED EMBODIMENTS

Preferred embodiments of the present invention will be hereinafter described in the form of a battery module employing a nonaqueous electrolyte secondary battery as examples.

First Embodiment

Figure 1:
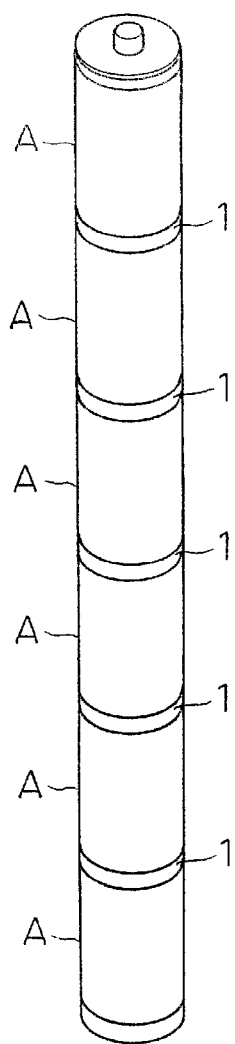
FIG. 1 is an external view of a conventional battery module.
Figure 2:
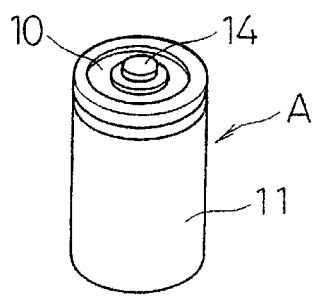
FIG. 2 is an external view of a conventional rechargeable cell.
Figure 3A:
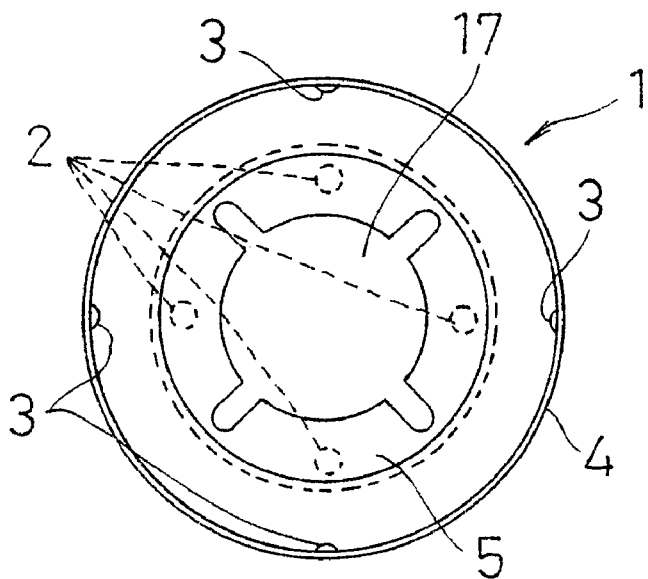
FIG. 3A is a plan view of a conventional connector.
Figure 3B:
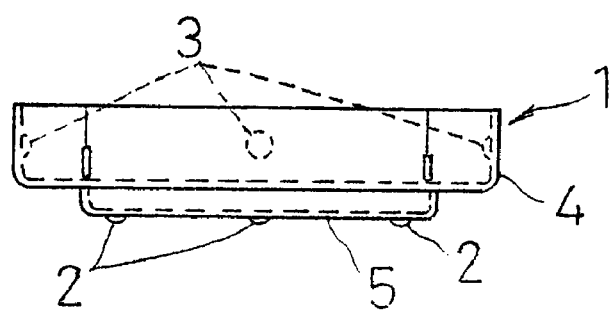
FIG. 3B is a side view of the conventional connector shown in FIG. 3A.
Figure 3C:
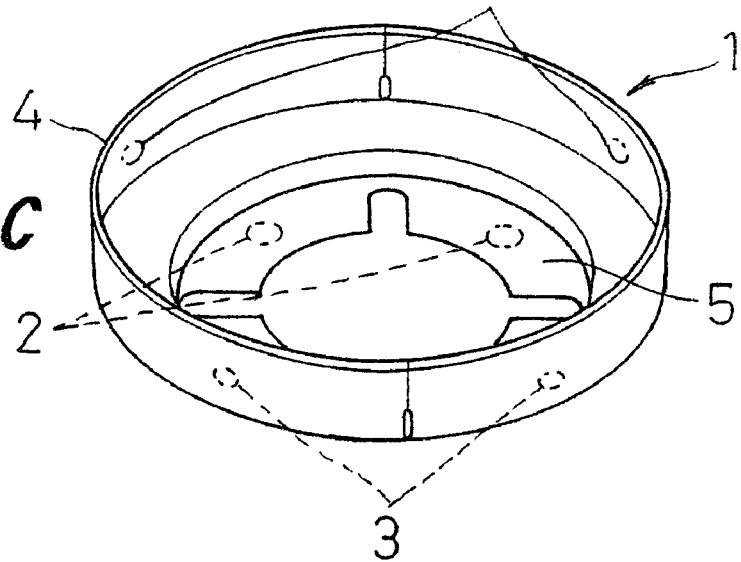
FIG. 3C is a perspective view of the conventional connector shown in FIG. 3A and FIG. 3B.
Figure 4:
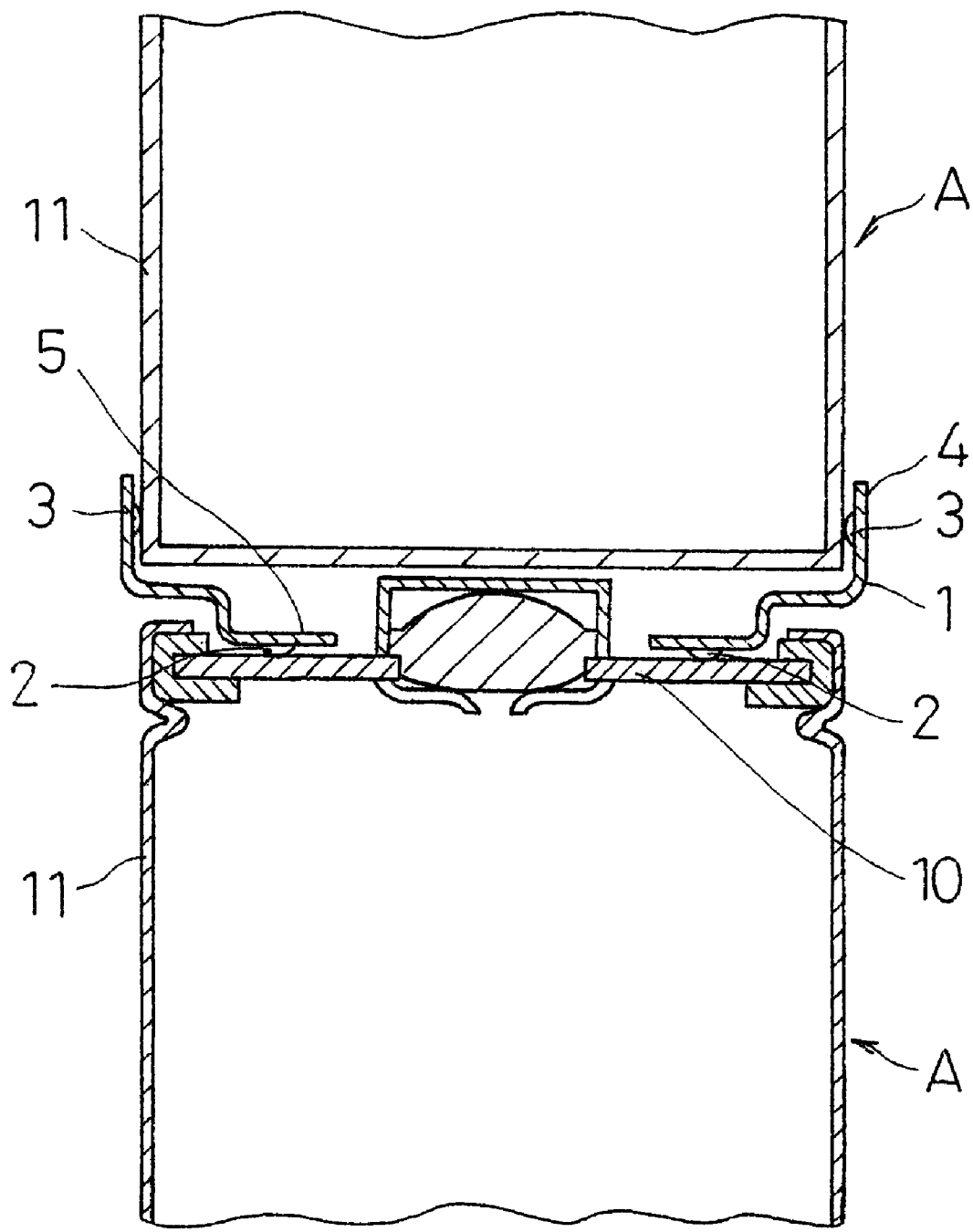
FIG. 4 is a cross sectional view of a connecting portion of the conventional battery module.
Figure 5:
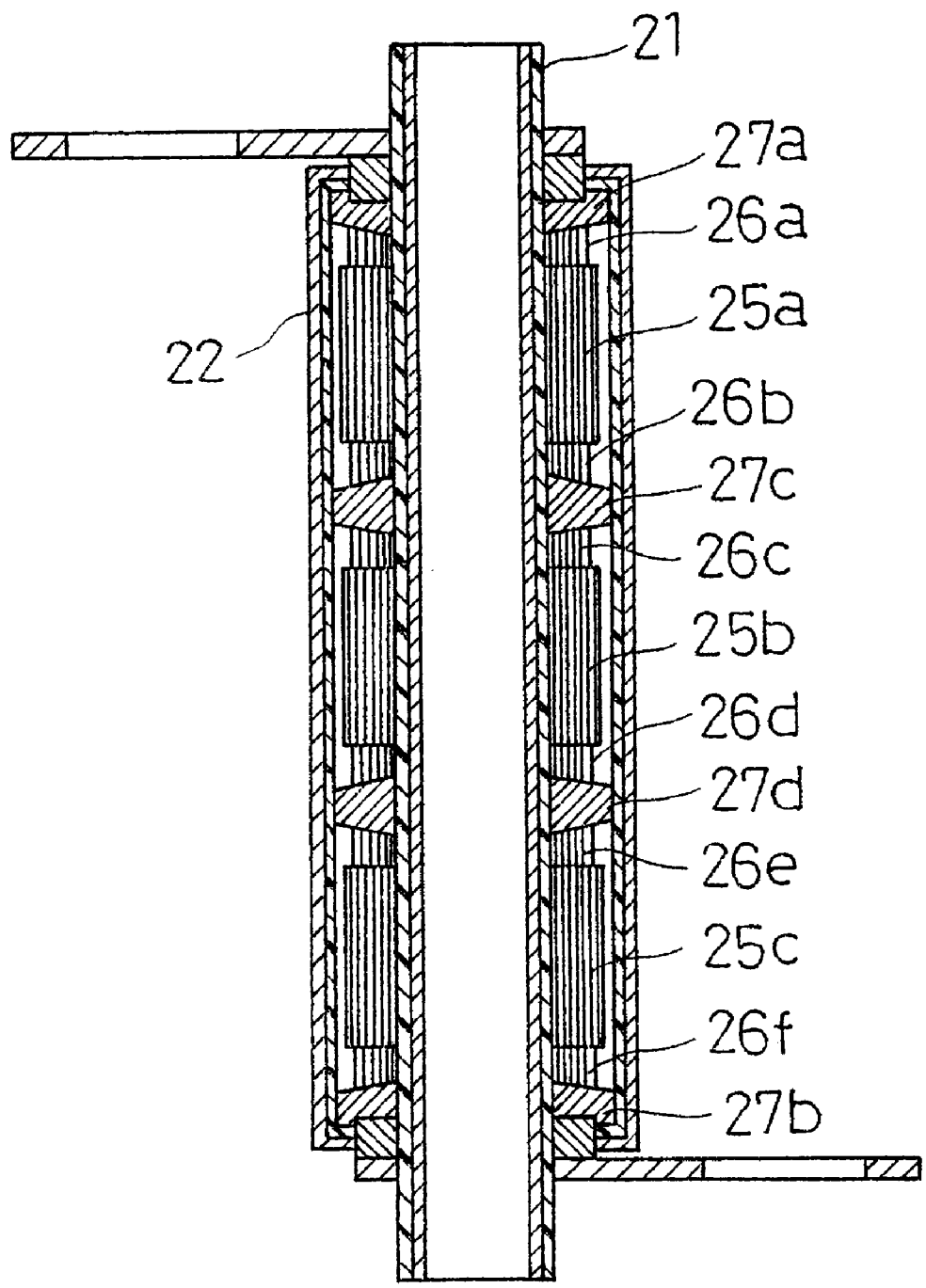
FIG. 5 is a cross sectional view of another conventional battery module.
Figure 6:
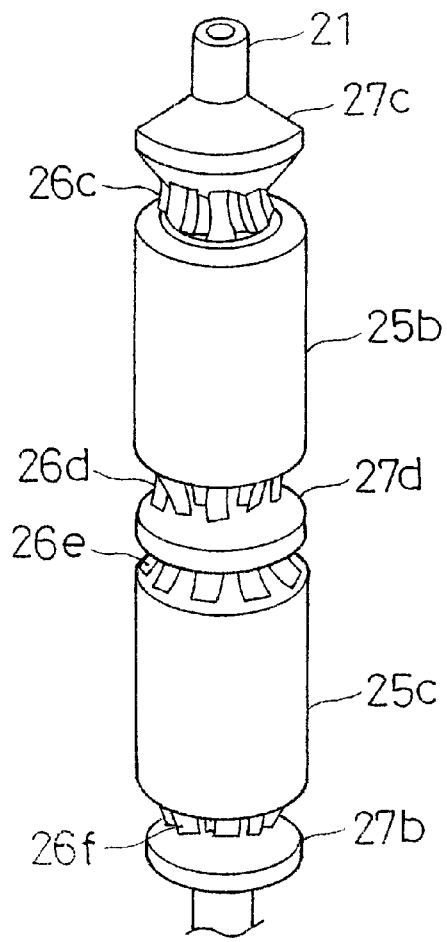
FIG. 6 is a perspective view of essential components of the conventional battery module.
Figure 7:
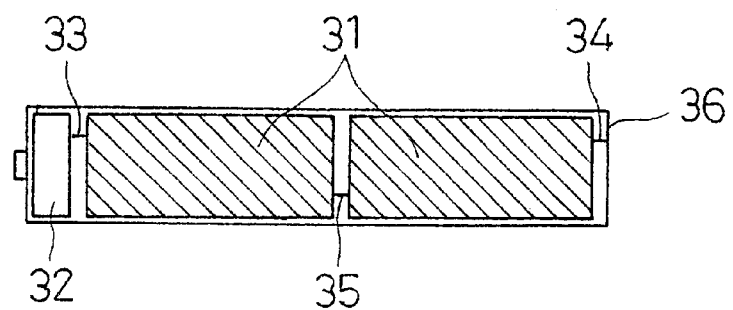
FIG. 7 is a cross sectional view of yet another conventional battery module.
Figure 8:
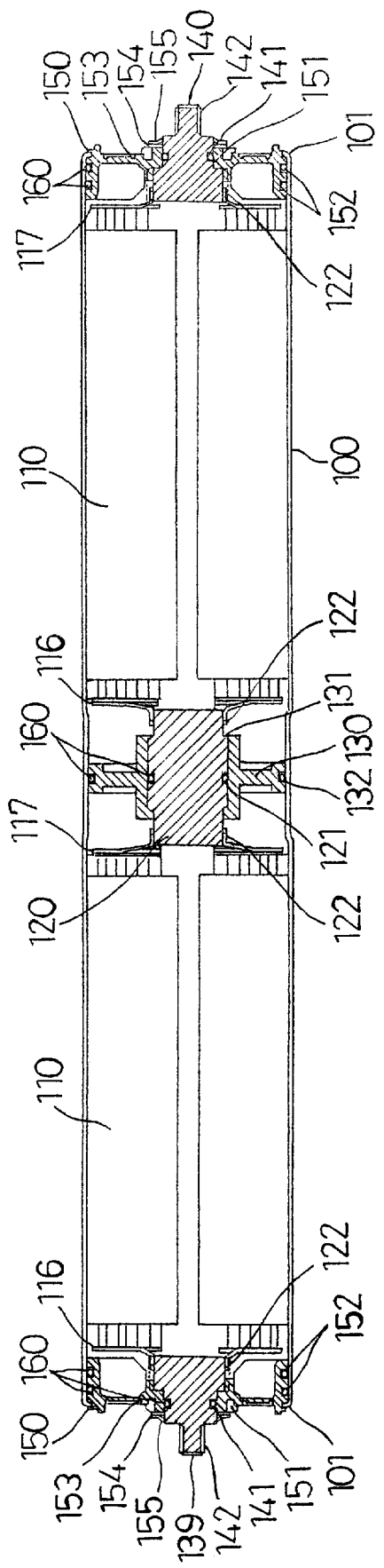
FIG. 8 is a cross sectional view of a battery module according to a first embodiment of the present invention.
Figure 9:
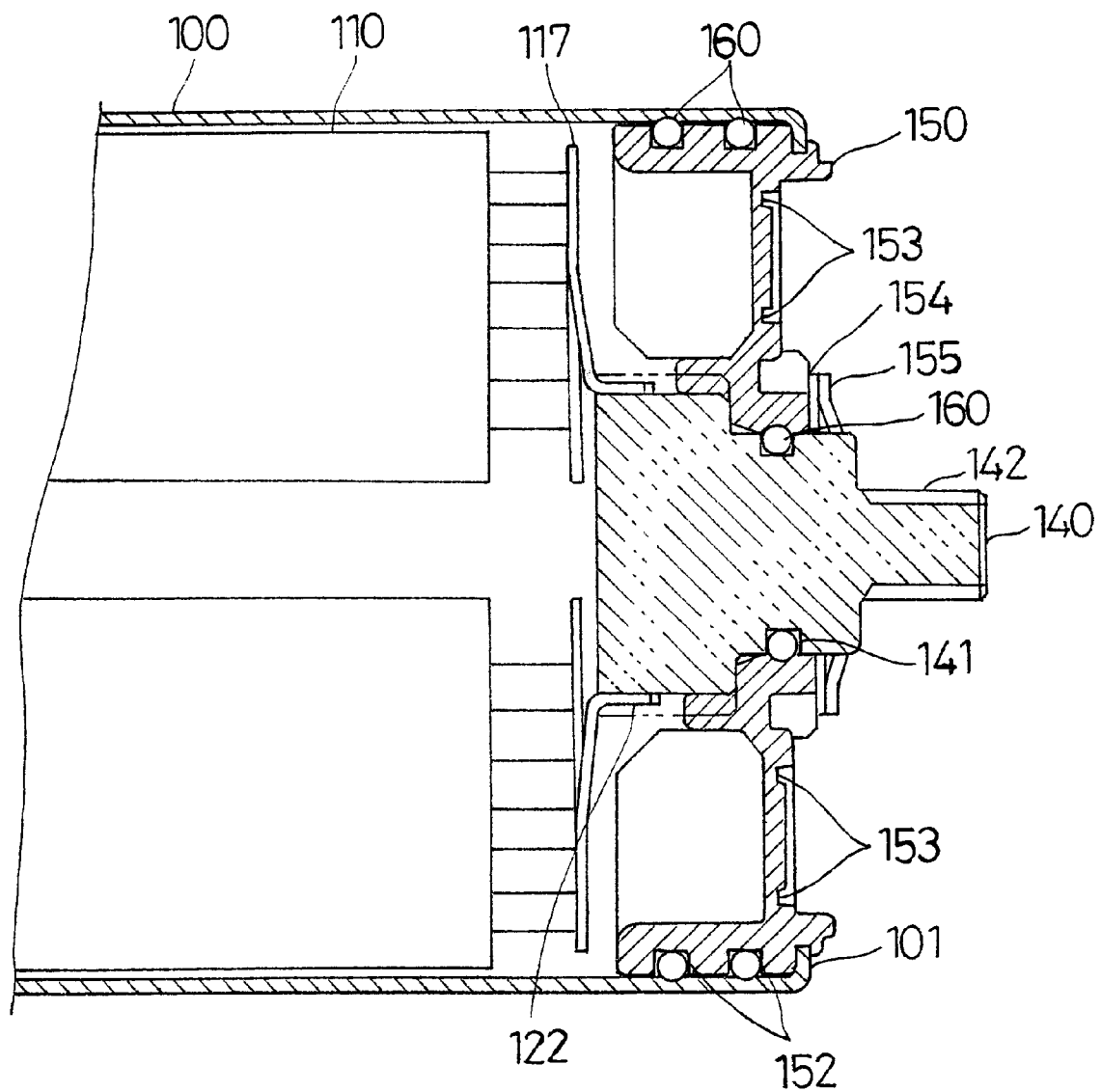
FIG. 9 is a cross sectional view of a terminal portion of the battery module according to the first embodiment of the invention.
Figure 10:
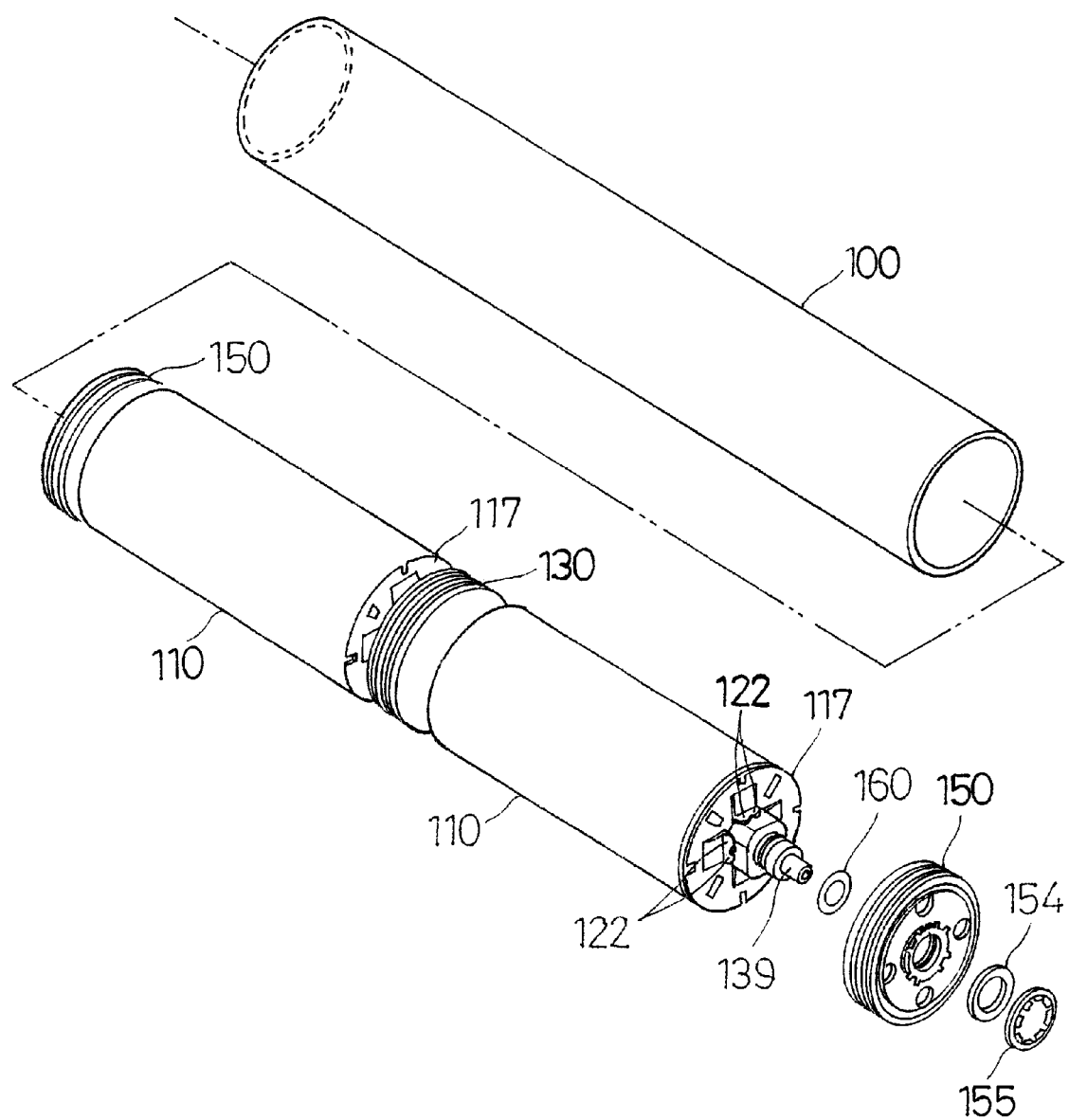
FIG. 10 is an exploded perspective view illustrating the structure of the battery module according to the first embodiment of the invention.
Figure 11:
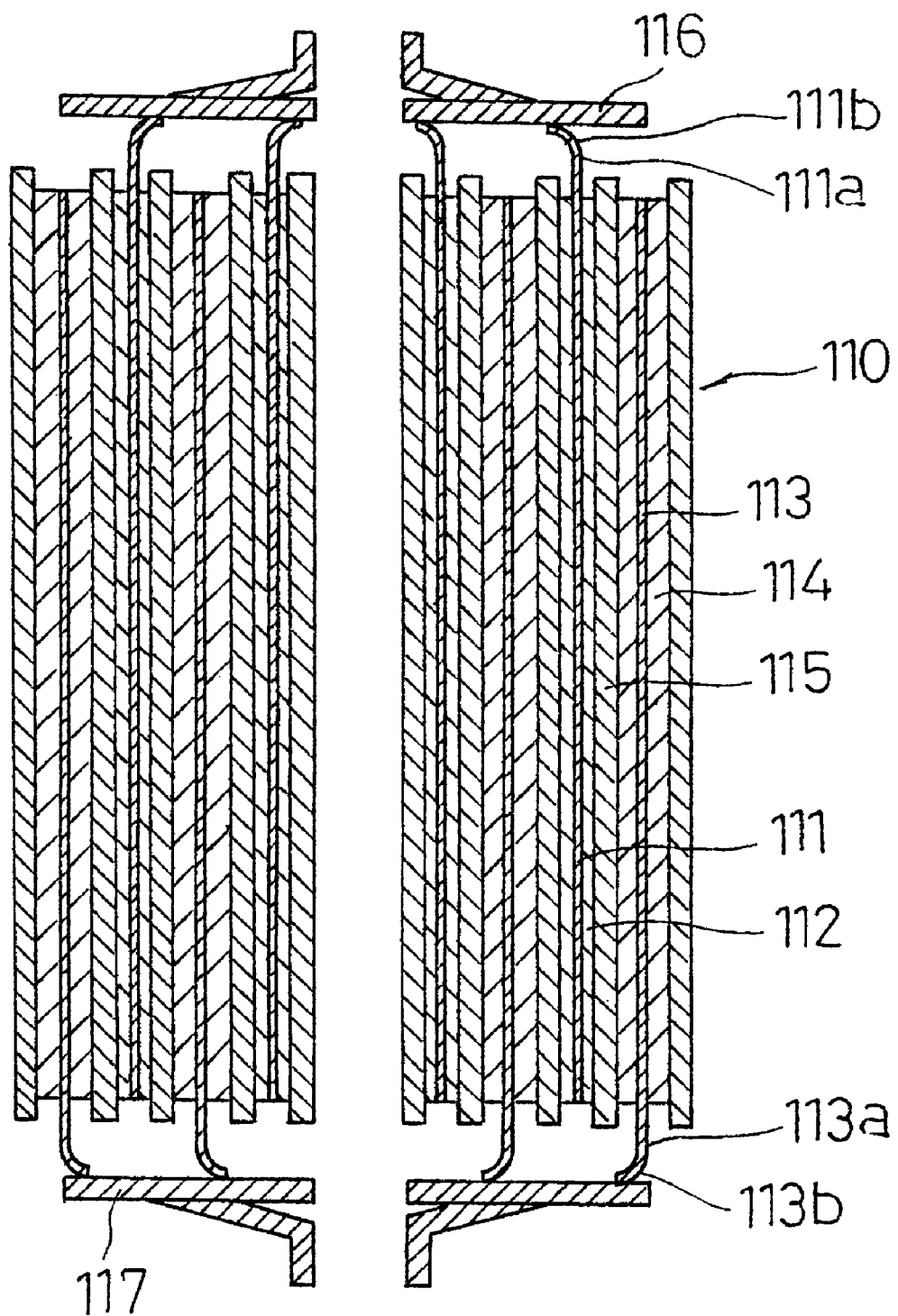
FIG. 11 is a cross sectional view showing a plate group and collector plates of the battery module according to the first embodiment of the invention.

FIG. 8 to FIG. 11 show a battery module according to a first embodiment of the present invention. FIG. 8 shows a cross sectional view of the battery module. FIG. 9 shows an enlarged cross sectional view of a terminal portion of the battery module. FIG. 10 shows a perspective view of the components of the battery module, and FIG. 11 shows a cross sectional view of a part of the battery module, the part including collector plates and a plate group.

The battery module of the present embodiment includes various components and a cylindrical case 100 for accommodating the components. The components include a plate group 110, a negative collector plate 117 being welded to the plate group 110, an electric connector 120 for connecting between the plate groups 110, a partition wall 130 for spatially isolating the plate groups 110, battery terminals 139, 140, and sealing plates 150.

As shown in FIG. 11, the plate group 110 is formed by overlaying a positive electrode plate and a negative electrode plate with a separator 115 interposed between them, and winding them in a spiral fashion. The positive electrode plate includes a positive collector 111 on which a positive active material 112 is coated, and the negative electrode plate includes a negative collector 113 on which a negative active material 114 is coated. The plate group 110 has protruded portions 111a, 113a on both ends thereof. The protruded portion 111a is a bared portion of the positive collector 111, on which the positive active material 112 is not coated. The protruded portion 113a is a bared portion of the negative collector 113, on which the negative active material 114 is not coated.

A flat portion 111b is formed by plastic deformation by pressing the protruded portion 111a of the positive collector 111. The positive collector plate 116 is welded to the flat portion 111b so that they are electrically connected to each other. A flat portion 113b is formed by plastic deformation by pressing the protruded portion 113a of the negative collector 113. The negative collector plate 117 is welded to the flat portion 113b so that they are electrically connected to each other.

The partition wall 130 is in the shape of a disk made of resin such as polypropylene and polyethylene. In the partition wall 130, a through hole 131 is concentrically formed for inserting the electric connector 120 therethrough. On the peripheral portion of the partition wall 130, there is formed a retaining groove 132 for holding an O-ring 160 being press-contacted on the inner surface of the case 100.

The electric connector 120 is made of a combining material of aluminum and copper, an aluminum portion being located on the positive side of the element for electromotive force, and a copper portion being located on the negative side thereof. The electric connector 120 is loaded into the partition wall 130 through the hole 131. The electric connector 120 has a retaining groove 121 for holding the O-ring 160 being pressed on the inner surface of the through hole 131.

The positive collector plate 116 and the negative collector plate 117 are electrically connected to the battery terminals 139, 140 or the electric connector 120 by means of welding at a welding point 122.

The sealing plate 150 is in the shape of a disk made of resin such as polypropylene and polyethylene. In the sealing plate 150, a through hole 151 is concentrically formed for inserting the battery terminal therethrough. On the peripheral portion of the sealing plate 150, there is formed a retaining groove 152 for holding an O-ring 160 being press-contacted on the inner surface of the case 100. Furthermore, an annular thin portion 153 which breaks at the predetermined internal pressure is formed in the sealing plate 150 to prevent the battery from explosion caused by an abnormal increase in the internal pressure of the battery.

Each end of the cylindrical case 100 is bent inwardly to form a terminal portion 101 for retaining the sealing plate 150 in place.

Each of the battery terminals 139 and 140 has a retaining groove 141 on its peripheral portion, the retaining groove 141 for holding the O-ring 160 being press-contacted on the inner periphery of the through hole 151 of the sealing plate 150. The battery terminals 139 and 140 also have a screw portion 142 for electrically connecting the batteries. The battery terminal 139 on the positive side is made of aluminum or the like, and the battery terminal 140 on the negative side is made of copper or the like.

Each of the battery terminals 139 and 140 is inserted into the through hole 151 and is fixed on the sealing plate 150 by an annular press spring 155.

The O-rings 160 respectively placed in the retaining grooves of the partition wall 130, the sealing plate 150, and the battery terminals 139 and 140 spatially isolate the elements for electromotive force. Preferably, a soft viscous sealant is applied on the surface of the O-ring 160 on which the component of the battery is touched.

A method of fabricating the battery module of the present invention includes the following steps. First, two plate groups 110 are manufactured, and then a positive collector plate 116 and a negative collector plate 117 are welded to opposite ends of each plate group 110. In parallel with the step of manufacturing the plate groups 110, an electric connector 120 provided with an O-ring 160 placed in a retaining groove 121 is loaded into a partition wall 130. In this case, a soft viscous sealant is previously applied in the groove 121 and on a portion of the partition wall 130 where the O-ring 160 is press-contacted. The negative collector plate 117 and the positive collector plate 116 both welded to the plate groups 110 are welded to the electric connector 120 at predetermined welding points 112, respectively. Then, each of battery terminals 139, 140 is welded to the positive collector plate 116 and the negative collector plate 117 at a predetermined welding point. The battery terminals 139, 140 are inserted into a through hole 151 of a sealing plate 150 and are fixed thereon with a washer 154 and an annular press spring 155. In this case, a soft viscous sealant is previously applied in a retaining groove of each of the battery terminals 139, 140, followed by placing an O-ring 160 in the retaining groove. Then, a soft viscous sealant is applied in retaining grooves 132, 152 formed on the outer peripheries of the partition wall 130 and the sealing plate 150, respectively. Subsequently, an O-ring 160 is placed in each of the retaining grooves 132, 152. Such an assembly of these components is accommodated in a case 100, in which a soft viscous sealant is previously applied on a portion to be press contacted with the O-ring 160. Then, a terminal portion 101 of the case 100 is inwardly bent at a predetermined position.

According to the invention, due to the use of a single case, the battery module has a higher mechanical strength than that of the conventional one. Moreover, connecting portion of the battery module is protected from corrosion damage since the portion is accommodated in the case. Furthermore, a mass energy density and a volume energy density of the battery module are higher than those of the conventional one since a dead space in the battery module is minimized.

Second Embodiment

Figure 12:
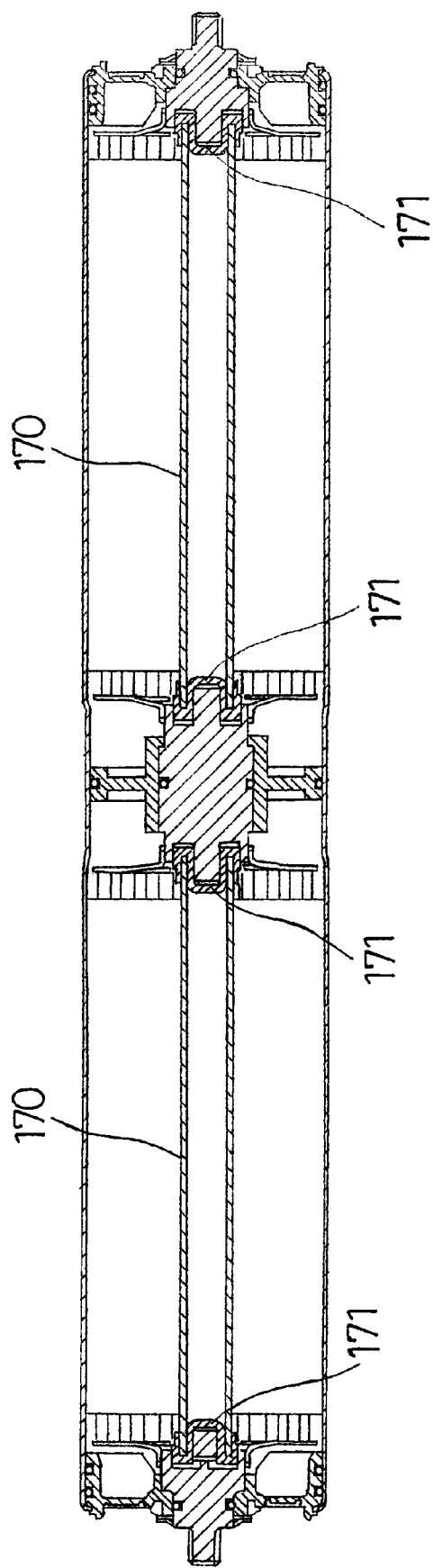
FIG. 12 is a cross sectional view of a battery module according to a second embodiment of the present invention.
Figure 13:
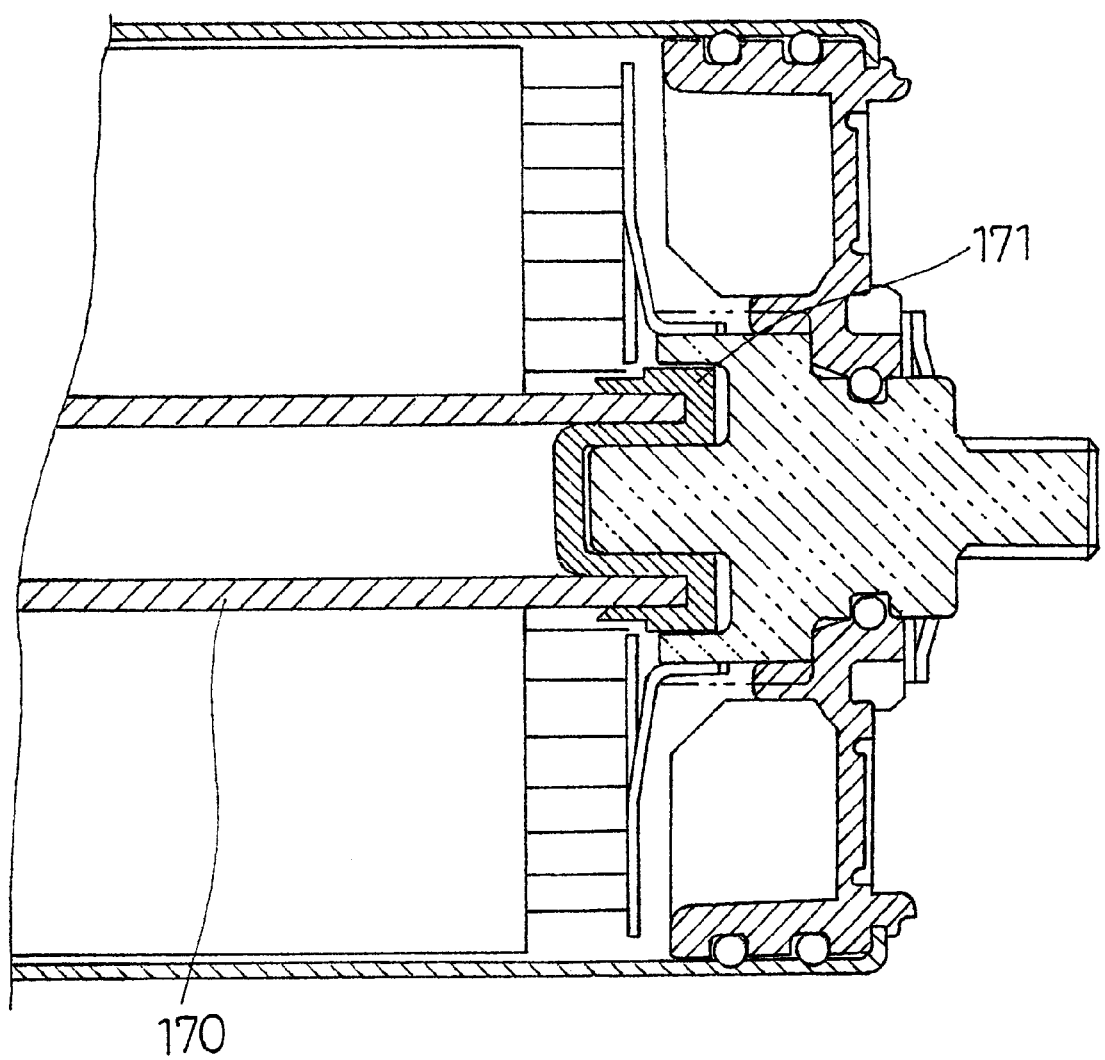
FIG. 13 is a cross sectional view of a terminal portion of the battery module according to the second embodiment of the invention.

A battery module of the present embodiment is configured just as the battery module of the first embodiment except for the configuration thereof shown in FIG. 12 and FIG. 13. In the present embodiment, a positive electrode plate is prepared by coating a positive active material on a positive collector, and a negative electrode plate is prepared by coating a negative active material on a negative collector. These electrode plates are overlaid together with a separator interposed between them and are wound around an internal tube 170 made of stainless steel, aluminum, or the like in a spiral fashion to form a plate group. Then, the internal tube 170 is held between the battery terminal and the electric connector through an insulator 171, whereby the battery module is made vibration resistant.

Third Embodiment

Figure 14:
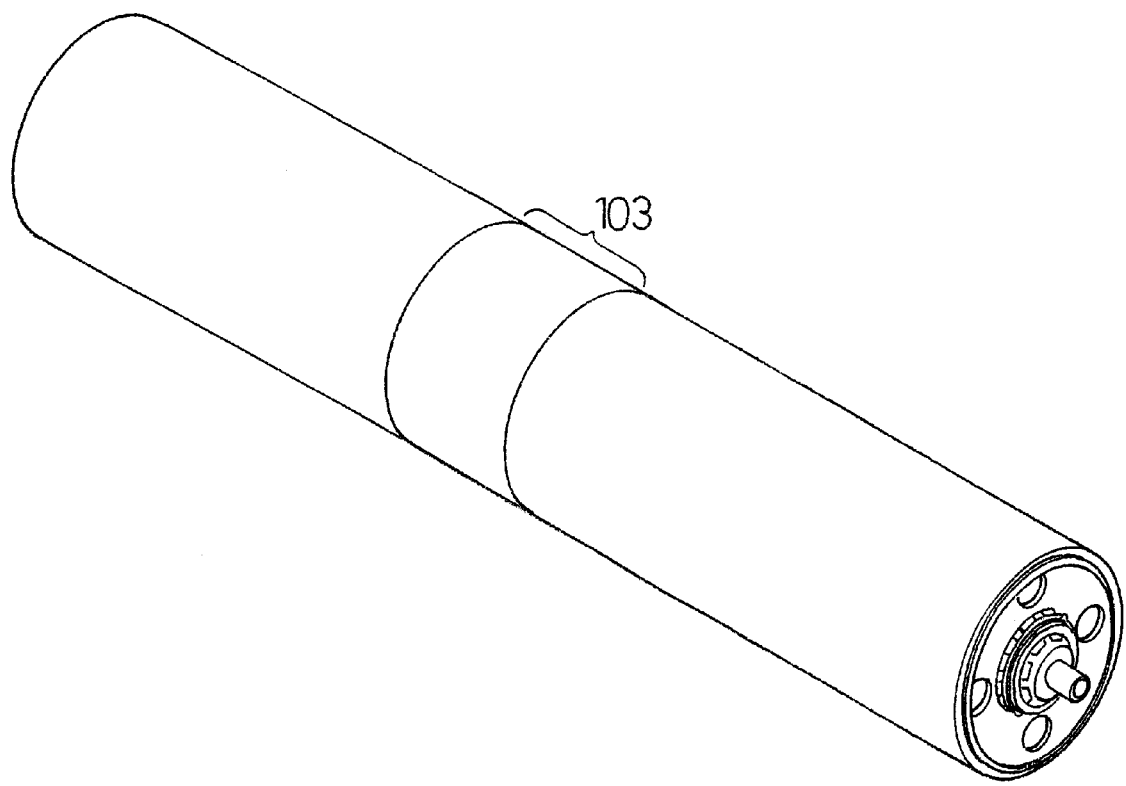
FIG. 14 is a perspective view of a battery module according to a third embodiment of the present invention.

A battery module of the present embodiment is configured just as the battery module of the first embodiment except for the configuration thereof shown in FIG. 14. In the present embodiment, a portion 103 of the case, which corresponds to the position of a partition wall, is pressed down to decrease a diameter thereof. Thereby, an adhesion between the case and the partition wall is increased, and the reliability of the spatial isolation between the elements for electromotive force is increased.

Although the battery module including two elements for electromotive force is explained in each of the above embodiments, it is to be understood that the present invention is not limited to any particular number of batteries in the battery module. The invention is not limited to the battery module employing a nonaqueous electrolyte rechargeable battery. It is also possible to employ a case in an oval shape in a battery module. Further, the electric connector may be fixed to the partition wall by insert molding. Furthermore, an insulating layer may be applied on the inner surface of the case to prevent a short circuit to be developed by contacting the element for electromotive force with the case.

According to the present invention, a battery module offering resistance to corrosion and showing a high mechanical strength, a high reliability, a high voltage energy density, and a high volume energy density is realized.

Although the present invention has been fully described in connection with the preferred embodiment thereon, it is to be noted that various changes and modifications apparent to those skilled in the art are to be understood as included within the scope of the present invention as defined by the appended claims unless they depart therefrom.

What is claimed is:

1. A battery module comprising:

a cylindrical case;

a plurality of elements for electromotive force accommodated in the case and arranged in series in an axial direction of the case;

a partition wall for spatially isolating the elements for electromotive force from one another;

an electric connector for electrically connecting the elements for electromotive force through the partition wall; and sealing plates placed on both ends of the case.

2. The battery module according to claim 1, wherein the partition wall is made of resin.

3. The battery module according to claim 1, wherein the electric connector is loaded into the partition wall by pressing the electric connector into a through hole formed in the partition wall.

4. The battery module according to claim 3, wherein the electric connector is subjected to at least one of a ultrasonic vibration treatment and a heat treatment when the electric connector is loaded into the through hole of the partition wall.

5. The battery module according to claim 1, wherein a retaining groove is formed on a peripheral portion of the electric connector, and an O-ring is retained in the retaining groove and is press-contacted on an inner surface of the through hole of the partition wall.

6. The battery module according to claim 5, wherein a soft viscous sealant is applied on at least one of the retaining groove of the electric connector and a boundary face between the partition wall and the O-ring.

7. The battery module according to claim 1, wherein the electric connector is made of a combining material of aluminum and copper.

8. The battery module according to claim 1, wherein the electric connector is fixed to the partition wall by insert molding.

9. The battery module according to claim 1, wherein a retaining groove is formed on a peripheral portion of the partition wall, and an O-ring is retained in the retaining groove and is press-contacted on an inner surface of the case.

10. The battery module according to claim 1, wherein a diameter of a portion of the case is decreased by applying pressure, the portion corresponding to a position of the partition wall.

11. The battery module according to claim 9, wherein a soft viscous sealant is applied on at least one of the retaining groove of the partition wall and a boundary face between the case and the O-ring.

12. The battery module according to claim 1, wherein an electrical insulating layer is provided on an inner surface of the case, the electrical insulating layer being made of at least one selected from an oxide film, a resin material, and an elastomer.

* * * * *